United States Patent [19]
Stephenson

[11] Patent Number: 5,239,394
[45] Date of Patent: Aug. 24, 1993

[54] APPARATUS FOR STORING IMAGE INFORMATION ON A PHOTOGRAPHIC RECORD MEMBER

[75] Inventor: Stan W. Stephenson, Spencerport, N.Y.

[73] Assignee: Eastman Kodak Company, Rochester, N.Y.

[21] Appl. No.: 594,801

[22] Filed: Oct. 5, 1990

[51] Int. Cl.⁵ .............................................. H04N 1/04
[52] U.S. Cl. ................................. 358/488; 358/214; 369/125
[58] Field of Search .................. 358/488–489, 358/214–216; 369/115, 125, 130

[56] References Cited

U.S. PATENT DOCUMENTS

| | | | |
|---|---|---|---|
| 4,051,528 | 9/1977 | Takeda et al. | 358/216 |
| 4,122,511 | 10/1978 | Urbach | 358/215 |
| 4,641,198 | 2/1987 | Ohta et al. | 358/214 |
| 4,980,781 | 12/1990 | Yamamoto et al. | 358/489 |

Primary Examiner—Stephen Brinich
Attorney, Agent, or Firm—David M. Woods

[57] ABSTRACT

An apparatus for storing electronic data on a storage area of a photographic record member such as a photographic negative, print or transparency is disclosed. The photographic record member is located on a translation table. Data related to the image contained on the photographic record member is written to and retrieved from a circular recording track located within the storage area using a rotating transducer head. Alignment of the transducer head to the circular recording track is accomplished by sampling the output of the transducer head during an alignment operation at a minimum of two points and controlling the movement of the translation table accordingly.

12 Claims, 4 Drawing Sheets

APPARATUS FOR STORING IMAGE INFORMATION ON A PHOTOGRAPHIC RECORD MEMBER

BACKGROUND OF THE INVENTION

The present invention is directed to an apparatus for storing electronic data on a photographic record member. More specifically, the present invention is directed to an apparatus for storing and retrieving electronic data corresponding to image information contained within a photographic record, wherein the electronic data is stored in a circular track format on a recording medium located on a surface of the photographic record member.

Advances in the application of electronics to photographic processing techniques have led to photographic processing systems that utilize a variety of electronically encoded parameters of an original image to enhance the quality of photographic prints. These parameters may include the image density, contrast and color balance of the original which are utilized by the photographic processing systems to compensate and correct for variables in the reproduction process. The use of electronically coded image information also insures that an accurate reproduction of the original can be produced should the quality of the original photographic image degrade. For example, color characteristics of an original photographic negative may be degraded from mishandling and improper storage of the negative. A proper print can be obtained, however, if the negative is electronically scanned and the above noted parameters stored in electronic form. It is also preferable that the entire photographic original be scanned and stored to permit electronic reproduction of the original image if desired.

An example of one proposed system for storing information on a photorecord is disclosed in U.S. Pat. No. 4,554,591 issued to Kee. The system in Kee incorporates a storage medium, such as a magnetic or optical strip, that is attached to the photorecord. Information that corresponds to the visual image recorded on the photorecord is stored on the storage medium. A helical scan recording technique is utilized to record and retrieve the information stored on the storage medium. The use of helical scan recording technique, however, requires that the photorecord be bent around a helical scan head as illustrated in FIG. 5 of Kee causing physical degradation of the photorecord.

In view of the above, it would be desirable to provide a system in which the encoded data corresponding to a photographic original can be conveniently stored and retrieved without requiring that the photographic record member be bent or distorted. It would also be preferable if the encoded data is stored directly on the photographic record member so that the encoded data is always readily available and correlated with the photographic record member.

SUMMARY OF THE INVENTION

The present invention provides an apparatus for storing electronic data on a photographic record member such as a photographic negative, print or transparency. A storage area is provided on a surface of the photographic record member. Data related to the image contained on the photographic record member is written to and retrieved from a circular recording track located within the storage area using a rotating read/write head.

More specifically, a mechanism is provided for locating a photographic recording member on a surface of a translation table. The read/write head is located above the surface on a rotatable arm that is driven by a motor which is synchronized to a desired video output format. A translation adjustment mechanism is provided to control the movement of the translation table in three dimensions with respect to the read/write head. Alignment of the read/write head with respect to a recorded track of information is accomplished by a control unit that controls the operation of the translation adjustment mechanism. The control unit samples a signal recorded on the recorded track at a minimum of two evenly spaced points, and controls the translation adjustment mechanism to move the translation table until a parameter, such as a voltage level, associated with each of the samples of the signal is within predetermined limits.

BRIEF DESCRIPTION OF THE DRAWINGS

With the above as background, reference should now be made to the following detailed description of the invention and the preferred embodiments thereof along with the accompanying drawings in which.

DETAILED DESCRIPTION OF THE PREFERRED EMBODIMENTS

The invention utilizes conventional magnetic or optical recording technology to read and write data to and from a storage area provided on a photographic record member. The data written to the storage area may include, for example, an electronic representation of a photographic image stored on the photographic record member or data specifically related to particular qualities of the photographic image such as color balance. A read/write head is located on a rotating arm that is driven by a motor which is synchronized to the desired video output format. For example, the motor rotates the arm at a speed of 1800 RPM to enable recording of a full frame image during one rotation. A translation adjustment system is provided to adjust of the translation table, and thereby the location of the photographic record member, in relation to the rotating read/write head. Alignment of the photographic record member with respect to the read/write head during a read/write operation is accomplished by sampling the signal reproduced by the read/write head at a minimum of two points along a circular recorded track and adjusting the location of the photographic record member until the sample signals are within predetermined limits.

Figure 1:
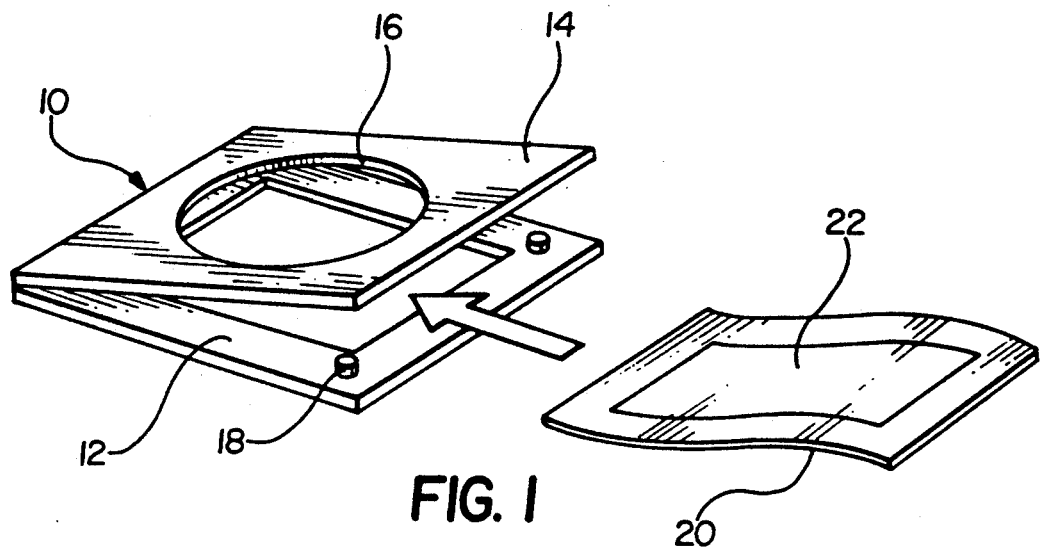
FIG. 1 illustrates an image sleeve that is used to retain a photographic record member.
Figure 2:
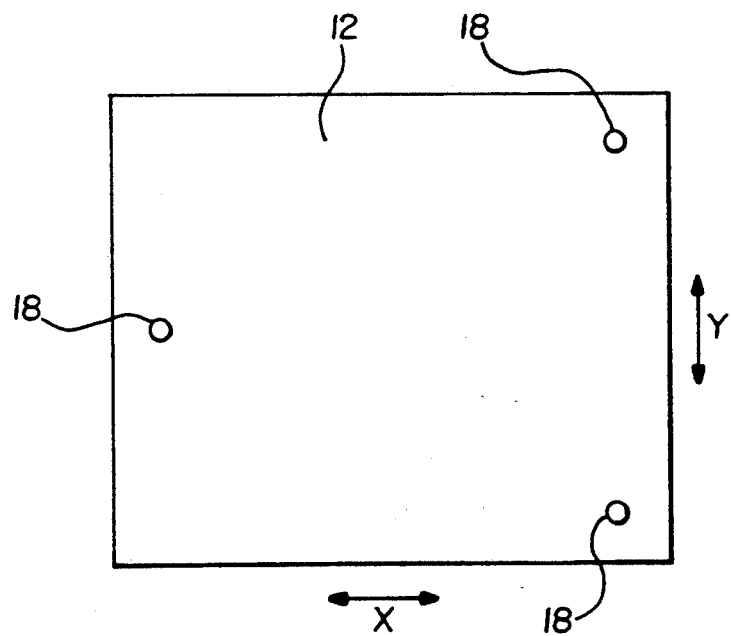
FIG. 2 illustrates a top view of a retaining plate of the image sleeve illustrated in FIG. 1.

A preferred embodiment of the invention will now be discussed with reference to FIG. 1. An image sleeve 10 is shown that includes a retaining plate 12 and a hinged top cover 14 having an opening 16 formed therein. The retaining plate 12 includes three coarse alignment pins 18 arranged in a triangular pattern as shown in FIG. 2. A photographic record member 20, having a photographic image on a face side and a storage area 22 on a back side, is placed face down on the retaining plate 12 and in contact with the coarse alignment pins 18. The hinged top cover 14 is closed thereby retaining the photographic record member 20 within the image sleeve 10. Access to the storage area 22, however, can be obtained through the opening 16 in the top cover 14.

Figure 3:
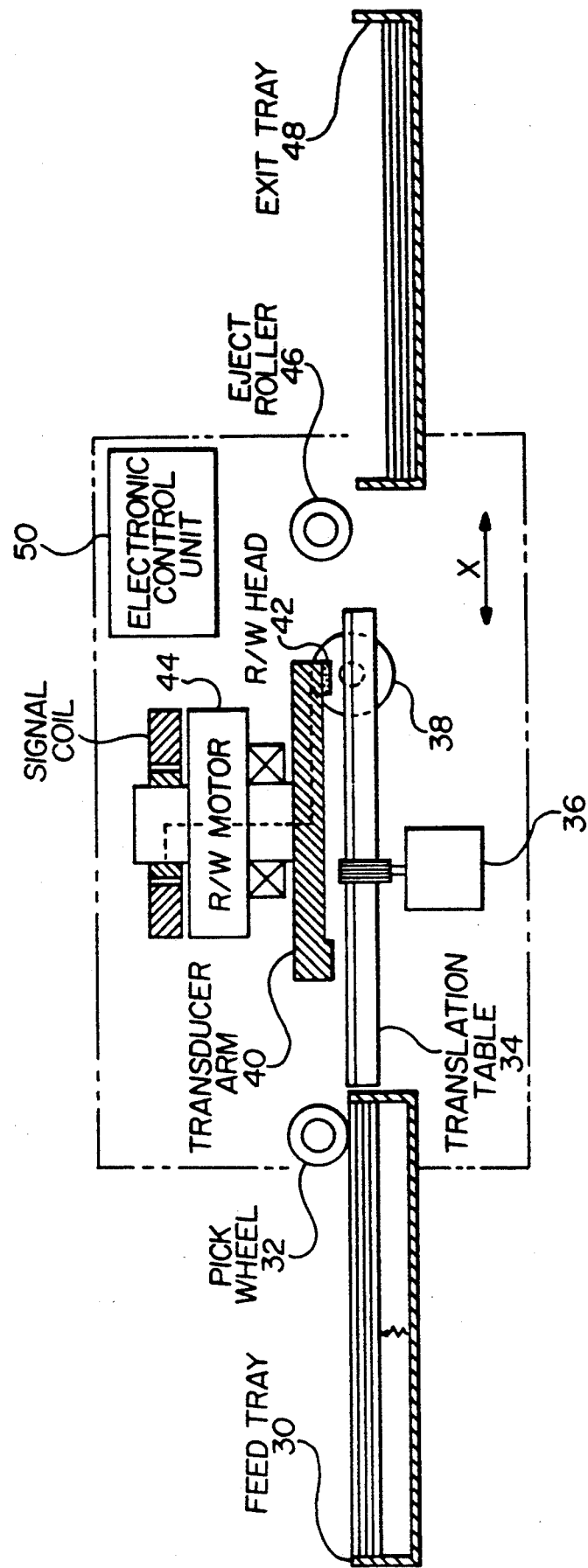
FIG. 3 illustrates a system in accordance with the present invention for reading and writing information to and from a storage area located on the photographic record member illustrated in FIG. 1.

Referring now to FIG. 3, a system for reading and writing information to and from the storage area 22 of the photographic record member 20 is shown including a feed tray 30, a pick wheel 32, a translation table 34, an X-translation control motor 36, a Y-translation control motor 38, a transducer arm 40, a read/write head 42, a read/write motor 44, an eject roller 46, and an eject tray 48. The X-translation control motor 36 is coupled to a drive mechanism (not shown) that moves the translation table 34 back and forth in the X-direction. The Y-translation control motor 38 is coupled to a drive mechanism that moves the translation table 34 back and forth in the Y-direction (perpendicular to the X-direction and in the same plane as the surface of the translation table 34). Control of the overall operation of the various system components is provided by an electronic control unit 50. The electronic control unit 50 can be constructed using a software controlled microprocessor unit or discrete hardware components. The detailed operation of the system will be described below with reference to FIGS. 4A-4C.

Figure 4A:
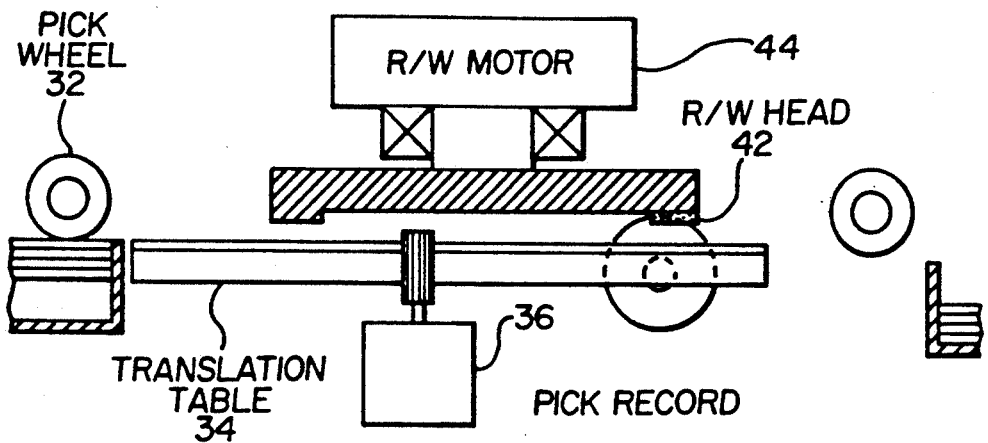
FIGS. 4A–4C illustrates the operation of the system illustrated in FIG. 3 at various stations.
Figure 4B:
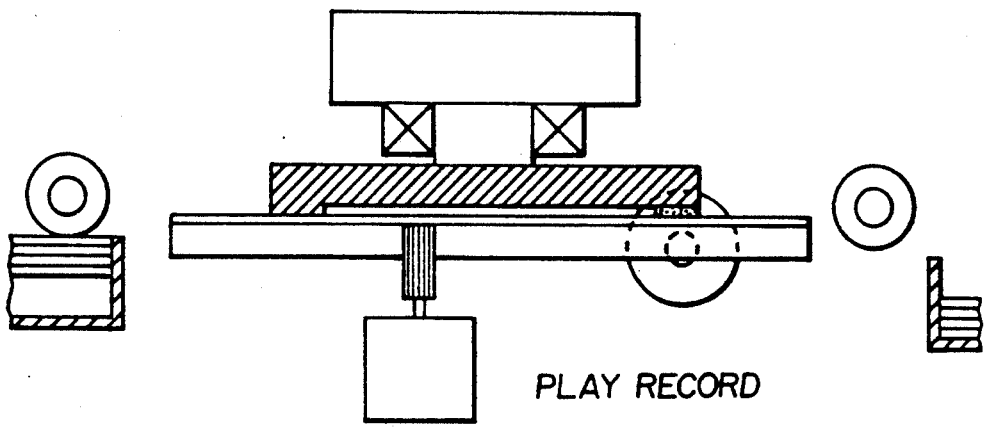

In order to begin either a read or write operation, the electronic control unit 50 controls the X-translation control motor 36 to move the translation table 34 to the PICK RECORD position illustrated in FIG. 4A. Although not specifically shown, the translation table 34 is driven by the X-translation motor through a cam system that causes the translation table 34 to be raised or lowered as it moves back and forth in the X-direction. Thus, the translation table 34 is lowered away from the read/write head 42 and located to a position adjacent to the feed tray 30 when moved to the PICK RECORD position. The pick wheel 32 is activated by the electronic control unit 50 to transfer a record sleeve 20 contained in the feed tray 30 to the translation table 34. Once the transfer of the record sleeve 20 to the feed tray 30 is complete, the electronic control unit 50 activates the X-translation control motor 36 to move the translation table 34 up and over to the PLAY RECORD position shown in FIG. 4B.

In the PLAY RECORD position, the storage area 22 of the photographic record member 20 is brought into direct contact, through the opening 16 in the top 14 of the record sleeve 10, with the read/write head 42 located on the transducer arm 40. The read/write motor 44 is then activated by the electronic control unit 50 in order to rotate the transducer arm 40 at the desired operating speed. A write operation is then performed to write data onto the storage area 22 of the photographic record member 20 in the form of a circular recording track by applying a write signal to the read/write head 42.

It should be noted that in the illustrated embodiment, the X-translation control motor 36 provides only a course positioning of the record sleeve 10 in relation to the read/write head 42. The coarse positioning is sufficient for a write operation, as the recording track can be written at any location within the storage area 22. A read operation, however, requires that a circular recording track previously recorded within the storage area 22 be closely aligned with the circular travel path of the read/write head 42 as it is rotated by the transducer arm 40. The electronic control unit 50 provides fine adjustment of the position of the record sleeve 10 with respect to the read/write head 42 by sampling the output signal from the read/write head 42 at a minimum of two points, preferably located 90 degrees apart, along the rotation path of the read/write head 42. The electronic control unit 50 performs a comparison between a selected parameter, such as voltage level, of the output signal at both sampling points, and controls the operation of the X-translation control motor 36 and the Y-translation control motor 38 to move the translation table 34 until the sampled signals are within predetermined limits, thereby indicating that the recording track is concentric with the read/write head 42. The output signal from the read/write head 42 can then be applied to a video processing circuit to produce an output video signal.

Figure 4C:
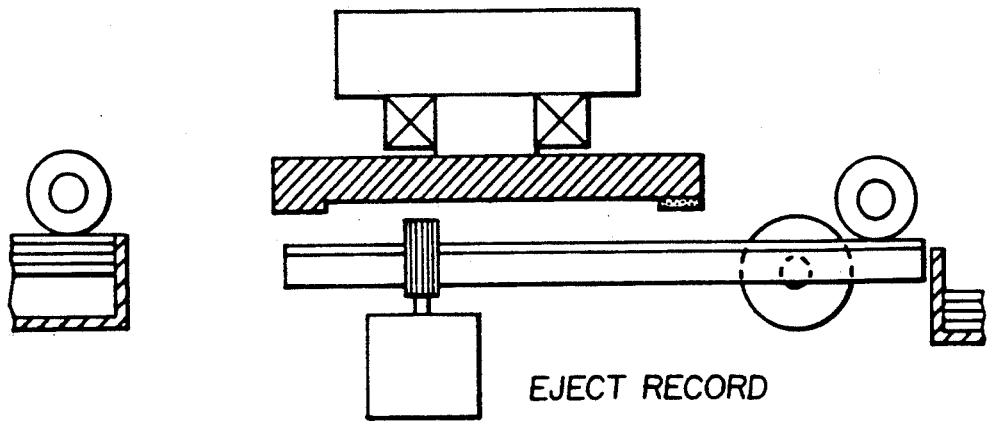

Once a desired read or write operation has been accomplished, the electronic control unit 50 controls the operation of the X-translation control motor 36 to move the translation table 34 over and down to the EJECT RECORD position adjacent the exit tray 48 as shown in FIG. 4C. The eject roller 46 is activated by the electronic control unit 50 to move the image sleeve 20 from the translation table 34 into the eject tray 46. The translation table 34 is then returned to the PICK RECORD position.

Figure 5:
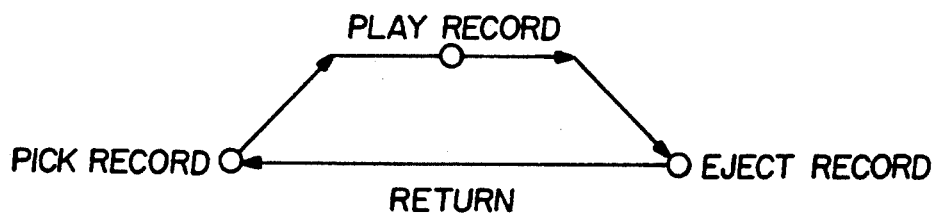
FIG. 5 illustrates the movement of a translation table incorporated in the system illustrated in FIG. 3 as the translation table is moved between the various stations illustrated in FIG. 4A–4C.

FIG. 5 illustrates the preferred path of the translation table 34 through the various positions discussed above. It should be noted that while the preferred embodiment employs a cam system driven by the X-translation control motor to raise and lower the translation table 34 to the PLAY RECORD position, other types of translation structures may be readily employed including the use of a separate motor and drive system to control movement of the translation table 34 in the vertical (Z) direction. Another alternative would be to provide a mechanism for raising and lowering the transducer arm 40 instead of raising or lowering the translation table 34. In such a case, only two-dimensional movement of the translation table 34 would be required.

Figure 6:
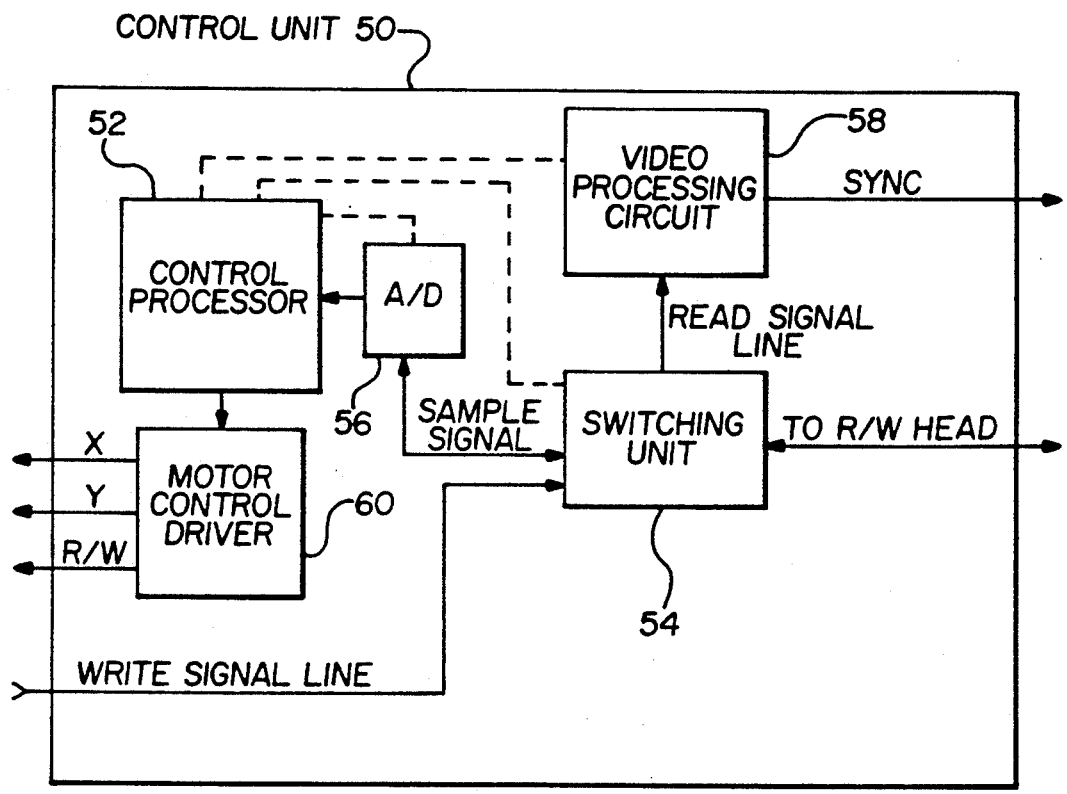
FIG. 6 is a schematic block diagram of an electronic control unit incorporated in the system illustrated in FIG. 3.

A schematic block diagram of the electronic control unit 50 is illustrated in FIG. 6. The electronic control unit 50 includes a control processor 52, a switching unit 54, an A/D converter 56, a video processing circuit 58 and a motor control driver 60. The switching unit 54 is used to selectively couple the read/write head 42 to one of a write signal line during a write operation, a sample signal line that is coupled to the A/D converter 56 during an alignment operation or a read signal line that is coupled to the video processing circuit 58 during a read operation. The video processing circuit 58 generates a sync signal that is supplied to the read/write motor 44 in order to synchronize the operation of the read/write motor 44 to the video signal to be written to and read from the storage area 22. The A/D converter 56 is used to convert the sampled signal generated by the read/write head 42 during an alignment operation to a digital signal that can be compared by the control processor 52. The control processor 52 controls the operation of the X-translation control motor and the Y-translation control motor through the motor control driver 60.

The invention has been described with reference to certain preferred embodiments thereof. It will be understood, however, that modifications and variations are possible within the scope of the appended claims.

For example, the present invention is not specifically limited to photographic record members containing conventional photographic images, but can be applied to any record member containing an image generated by some other means including electrostatically generated images and thermal printed images. In addition, although the use of an image sleeve is preferred in order to insure that the photographic record member will not be physically damaged, the record sleeve can be omitted and the photographic record member placed directly on the translation table. In such a case, the course alignment pins can be located on the translation table. As explained above, different translation mechanisms can be employed to bring the photographic record member in contact with the read/write head and to move the photographic record member relative to the read/write head during the concentric alignment procedure. Different structures, such as a disc, may also be employed to hold the read/write head instead of the transducer arm. Finally, although the preferred embodiment employs a read/write head to both read and write information to the storage area, separate devices can be used to perform the read function and the write function if desired.

What is claimed is:

1. An apparatus comprising: a translation table; locating means for locating a photographic record member on a surface of said translation table; a transducer head located above said surface on a rotating element; drive means for driving said rotating element; X-Y translation adjustment means for providing two dimensional movement of said translation table in the plane of said surface; means for bringing said transducer head in contact with a photographic record located on said surface by said locating means; and control means for controlling the operation of said X-Y translation adjustment means to align said transducer head during a read operation.

2. An apparatus as claimed in claim 1, wherein said control means for controlling the operation of said X-Y translation adjustment means samples a signal recorded on said photographic recording member on a recording track at a minimum of two spaced points, and controls said X-Y translation adjustment means to move said translation table until a parameter associated with each of said samples of said signal is within predetermined limits.

3. An apparatus as claimed in claim 2, wherein said two spaced points are 90 degrees apart.

4. An apparatus as claimed in claim 1, wherein said locating means includes an image sleeve having a retaining plate and a hinged top cover.

5. An apparatus as claimed in claim 4, wherein said retaining plate includes coarse adjustment pins and said top cover has an opening formed therein.

6. An apparatus for storing and retrieving information to and from a photographic record member, said apparatus comprising: a translation table; a transducer located about a surface of said translation table; an X-Y translation adjustment mechanism that provides two-dimensional movement of said translation table in the same place as said surface; a drive mechanism coupled to said transducer; a vertical translation adjustment mechanism coupled to at least one of said drive mechanism and said X-Y translation adjustment mechanism; a control unit for controlling the operation of said X-Y translation adjustment mechanism, said drive mechanism and said vertical translation adjustment mechanism.

7. An apparatus as claimed in claim 6, wherein said vertical translation adjustment mechanism brings said transducer in contact with a photographic record member located on said surface of said translation table during at least one of a read and write operation.

8. An apparatus as claimed in claim 7, wherein said control unit provides fine adjustment of the location of said photographic record member with respect to said transducer by sampling the output of said transducer at a minimum of two points along its travel path and comparing the sampled output at said two points while controlling the operation of said X-Y adjustment mechanism until the sampled output at said two points are within predetermined limits.

9. An apparatus as claimed in claim 6, further comprising an image sleeve for retaining a photographic record member, said image sleeve including a retaining plate and a hinged top cover having an opening therein.

10. An apparatus as claimed in claim 9, wherein said image sleeve further comprises coarse adjustment locating pins in said retaining plate.

11. An apparatus as claimed in claim 9, further comprising a feed tray configured to hold one or more image sleeves and a pick wheel for moving said image sleeves from said feed tray onto said surface of said translation table.

12. An apparatus as claimed in claim 11, further comprising an eject roller for moving said image sleeves of said surface of said translation table.

* * * * *